3,078,238
Patented Feb. 19, 1963

3,078,238
HYDROGENATION CATALYST AND METHOD
OF PREPARATION
Harold Beuther and Richard A. Flinn, Penn Hills Township, Allegheny County, Alfred M. Henke, Springdale, and Joseph B. McKinley, New Kensington, Pa., assignors to Gulf Research & Development Company, Pittsburgh, Pa., a corporation of Delaware
No Drawing. Filed July 24, 1959, Ser. No. 829,217
5 Claims. (Cl. 252—439)

This application is a continuation-in-part of our copending application Serial Number 722,634, filed March 20, 1958, now abandoned.

This invention relates to catalyst compositions and their preparation. More particularly this invention relates to supported catalyst compositions and their preparation.

The upgrading of lubricating oil stocks by catalytic hydrogenation has two important objectives. These two objectives are the attainment of an increased viscosity index and a decreased iodine number in the treated lubricating oil product. Viscosity index indicates the effect of change of temperature on the viscosity of an oil. A high viscosity index lubricant exhibits a relatively small change of viscosity with temperature and such a lubricant, therefore, tends to retain good viscosity characteristics under the increased temperatures to which it is subjected in an automobile engine.

The iodine number of an oil is an indication of the amount of unsaturated bonds present in either straight chain or cyclic molecules present in the oil at which iodine can be added. It is desirable to maintain the iodine number of an oil as low as possible since molecules having such unsaturated bonds have low oxidation stability and will cause deposit forming deterioration at the elevated temperature conditions existing in an engine during operation. Accordingly, it is seen that any upgrading process for lubricating oils should produce an oil having a relatively high viscosity index and a relatively low iodine number since each of these characteristics indicates that the oil will retain superior lubricating qualities under the elevated temperature conditions encountered during use.

One method of upgrading a lubricating oil stock is to subject the oil to a catalytic hydrogenation treatment. For a catalyst to be suitable in such a hydrogenation treatment it must be effective for the upgrading of the lubricating oil stock by producing a lubricant product possessing both a lower iodine number and a higher viscosity index. For the reduction of iodine number, the catalyst used must possess activity for the hydrogenation of unsaturated bonds since a low iodine number indicates a high degree of saturation. This type of catalyst activity is known as hydrogenation activity. In order to be effective for the production of a lubricating oil having an increased viscosity index, the catalyst must possess ring-scission activity. Ring-scission is a very selective type of cracking whereby the fused rings in a molecule are cracked open in the substantial absence of cracking or removal of alkyl side chains. The occurrence of ring-scission rather than cracking or removal of side chains is evidenced by the fact that analysis shows the average number of aromatic and saturated rings per molecule is reduced while the average molecular weight remains relatively constant. Generally, a catalyst having ring-scission activity will crack open the fused rings in a group leaving at least one ring in a group unopened and will not tend to open individual rings not fused with other rings in the molecule. The treatment of a lubricating oil charge stock to produce a product having a reduced number of fused rings per molecule without an appreciable change in the molecular weight of these molecules imparts a higher viscosity index to the oil.

Compositions containing nickel and tungsten are active catalysts for the hydrogenative upgrading of lubricating oil stocks. These catalysts are greatly improved by disposing them upon a carrier material possessing cracking activity and by sulfiding. It has now been discovered that a great improvement in the activity of these sulfided supported catalysts is accomplished by treating these catalysts with a halogen or a halogen containing compound, preferably fluorine or a fluorine containing compound. We have discovered that halogen addition to catalysts comprising sulfided supported nickel and tungsten greatly improves such catalysts in respect to hydrogenation activity in the treatment of lubricating oil stocks when the carrier material which is employed possesses catalytic cracking activity. We have further discovered that halogen promotion also imparts greatly improved ring-scission activity for the hydrogenative upgrading of lubricating oil stocks when the supporting material which is employed in such catalysts possesses a relatively high degree of cracking activity as specified below.

Although chlorine, bromine or iodine can be employed, fluorine is the most preferable halogen to be employed in accordance with this invention. The addition of fluorine to the catalysts of this invention is accomplished relatively easily, for example, by treatment of the supporting material with hydrogen fluoride. In this manner, fluorine can be added in an amount such that the finished catalyst contains 2.5 percent or more by weight of fluorine. This amount of fluorine is more than ample since the maximum improvement in ring-scission activity in a catalyst of this invention is achieved by the addition of only about 0.3 percent by weight of fluorine to the catalyst and no further improvement in ring-scission activity is achieved by the addition of greater amounts of fluorine while the maximum improvement in hydrogenation activity in a catalyst of this invention is achieved by the addition of only about 0.8 percent by weight of fluorine to the catalyst and no further improvement in hydrogenation activity is achieved by the addition of greater amounts of fluorine. On the other hand, when employing ordinary methods, it is difficult to add a sufficient quantity of other halogens to the catalyst of this invention to effect a substantial improvement in activity. For example, when treating a supporting material with either ammonium bromide or hydrobromic acid the adherence to the catalyst of only 0.03 percent by weight of bromine based on the completed catalyst resulted and when treating a supporting material with either ammonium chloride or hydrochloric acid the adherence to the catalyst of only 0.01 percent by weight of chlorine resulted based on the completed catalyst. These amounts of chlorine and bromine are not sufficient to effect an improvement in catalyst activity as substantial as can be achieved by employing fluorine in the amounts noted above.

It is preferable that the halogen be added to the catalyst in an amount greater than the minimum amount necessary to effect the maximum improvement in catalyst activity. For example, when fluorine is employed it is preferable to add to the catalyst 2.5 weight percent or more of fluorine, based on the total catalyst weight, even though the improvement in catalyst activity with this amount of fluorine is no greater than the improvement achieved by the addition of much smaller amounts of fluorine to the catalyst. The reason for this is that after long throughput intervals onstream some fluorine on the catalyst becomes dissolved. Even though the stability of fluorine on the catalyst is good, some loss will occur after long throughput intervals and the addition of an excess of fluorine will allow the catalyst to remain onstream for a longer interval without regeneration than would otherwise be possible.

We have discovered that halogenated sulfided supported nickel and tungsten containing catalyst exhibit a much greater resistance to deactivation with age as compared to similar unsupported catalysts. We have found that especially valuable lubricating oil hydrogenation catalysts are obtained by using as a support a cracking catalyst and preferably a cracking catalyst having the specified degree of cracking activity as described more fully hereinafter. The catalysts of this invention have the important advantage over unsupported catalysts that they can be regenerated more effectively and more economically. However, because of the long life characteristic of the catalysts of this invention, they can be employed for extremely long throughput intervals before regeneration becomes necessary.

The catalyst composition of this invention comprises halogenated sulfided supported nickel and tungsten wherein the carrier material possesses cracking activity.

The amount of nickel plus tungsten present in the catalyst should be 5 percent to 40 percent of the total catalyst weight, expressed as pure metals. Preferably, the nickel and tungsten present should comprise 10 percent to 25 percent of the total catalyst weight. The atomic ratio of tungsten to nickel should be between one atom of tungsten to 0.1 atom of nickel and one atom of tungsten to 5 atoms of nickel, generally, but is preferably within the range of one atom of tungsten to 0.3 atom of nickel and one atom of tungsten to 4 atoms of nickel.

The nickel and tungsten are present in some form of combination or mixture with sulfur. We have found that the amount of sulfur present in the catalyst is preferably between 2 percent and 23 percent of the catalyst weight. More preferably, the amount of sulfur on the catalyst is equivalent to that amount of sulfur necessary to convert at least 35 percent of the active metals to their sulfides and, most preferably, the amount of sulfur on the catalyst is equivalent to that amount of sulfur necessary to convert between about 50 and 63 percent of the active metals to their sulfides.

The carrier material employed should be one possessing catalytic cracking activity and it is especially desirable that the carrier material possess a specified degree of cracking activity which can be conveniently defined by relating it to the Kellogg cracking activity scale, developed by The M. W. Kellogg Company. This scale defines cracking activity as percent by volume of conversion obtained by passing a standard charge stock through the catalyst under standard test condition. The Kellogg cracking activity scale is explained in "Physical, Chemical and Catalytic Testing of Diakel Powdered Cracking Catalyst," a technical report of the Petroleum Research Division of The M. W. Kellogg Company, dated June 7, 1943. The carrier materials used in this invention preferably possess a cracking activity corresponding to a rating of at least 12 on the Kellogg activity scale, more preferably possess a cracking activity corresponding to a rating of between 35 and 80 on the Kellogg scale and most preferably possess a cracking activity corresponding to a rating of between 60 and 80 on the Kellogg scale. These values relate to the cracking activity of the carrier itself in an unpromoted state and in the form in which it exists when it is impregnated with the active metals.

To determine the Kellogg cracking activity of a catalyst, the catalyst is tested as a powder under the following cracking conditions:

| | |
|---|---|
| Feed | 35° A.P.I. Mid-Continent gas oil. |
| Catalyst temperature | 850±5° F. |
| Pressure | Atmospheric. |
| Catalyst charge | 710 grams. |
| Oil rate | 500±20 cubic centimeters per hour. |
| Velocity—inlet conditions | Approximately 0.1 foot per second. |
| Weight of oil per hour per weight of catalyst bed | 0.6±0.02. |
| Length of cracking test | 2 hours. |
| Blowdown nitrogen | 3 cubic feet per hour (0.2 linear foot per second). |

The oil feed used in the cracking test is a light Mid-Continent gas oil with the following typical inspections:

| | |
|---|---|
| Gravity—°A.P.I | 34.8 |
| A.S.T.M. Distillation—° F.: IBP | 468 |
| 5% | 512 |
| 10% | 521 |
| 20% | 534 |
| 30% | 546 |
| 40% | 562 |
| 50% | 578 |
| 60% | 595 |
| 70% | 618 |
| 80% | 647 |
| 90% | 686 |
| 95% | 720 |
| E.P. | 748 |
| Aniline point—° F | 171 |
| Sulfur—weight percent | 0.29 |

The allowable variations of oil feed inspections are as follows:

| | |
|---|---|
| Gravity—°A.P.I | 35±1 |
| A.S.T.M. Distillation—° F.: | |
| 10% | 520±10 |
| 50% | 580±10 |
| 90% | 690±10 |
| E.P. | 750±25 |

The catalyst to be tested is heat treated at 850° F. for a two hour period before testing. This heat treatment is accomplished by filling a steel dish with 1100 grams of the catalyst under investigation and inserting it into a circulating air muffle furnace which has been preheated to 850±5° F. The catalyst should remain in the circulating air muffle furnace for two hours with the air stream flowing. The catalyst is then removed from the furnace.

The powdered catalyst test apparatus consists of a tubular reactor with a preheating coil and filter, a furnace, oil feed tank and pump, condenser, receiver and knockback trap, gas meter, and accessory equipment. In operating this test equipment, the reactor and preheating coil is mounted within the furnace and oil is pumped from the feed tank through transfer valves into the preheater coil. Oil vapors enter the reactor through a small orifice at the bottom of the fluid bed and flow upward. The cracked products leaving the bed pass into an enlarged settling zone, through a filter in the top of the reactor and through a condenser into a receiver situated in an ice water bath. Gases leaving the receiver pass through a knockback column cooled to −40° F. and then through a gas meter to a product gas holder.

The test reactor consists of a section of 1¼ inch pipe which is 4 feet, 9 inches in length, surmounted by a 6 inch section of 2 inch pipe containing a glass wool filter. A preheater coil consisting of 10 feet of ¼ inch O.D. tubing is wound on the outside of the 1¼ inch pipe and connects with a small orifice in the conical bottom attached to the latter.

In preparing for the test, nitrogen is passed through the preheater coil and the reactor at a rate of 2 cubic feet per hour which is approximately equivalent to the oil vapor rate during the run. The catalyst is then slowly charged into the reactor and the reactor is then secured within the heated furnace. The receiver in the recovery system is held at 32° F. with wet ice and the knockback traps are held at −40° F., with a 50–50 mixture of ethyl glycol and water cooled with Dry Ice.

A two hour cracking test is then conducted under the conditions outlined above employing a charge stock as specified. After this test is concluded, a nitrogen blowdown of 3 cubic feet per hour should be continued for 30 minutes. The liquid product is then drawn from the receiver into a chilled bottle, weighed and placed in an ice box. A few minutes should be allowed for any liquid holdup in the knockback to drain out. The reactor is then removed from the furnace and the catalyst is poured into a container and weighed.

At the completion of the cracking test, three products are available for analysis—total liquid, total gas and spent catalyst. The specific gravity of the liquid product expressed as ° A.P.I. should be taken at 35–40° F. according to A.S.T.M. procedure Serial Number D–287–39t. The distillation of the liquid test product should be carried out according to A.S.T.M. method D86–40 appearing in "Distillation of Gasoline, Naphtha, Kerosene and Similar Petroleum Products" (the distillation procedure to be employed for the gas oil charged to the test unit is A.S.T.M. test D158–4 appearing in "A.S.T.M. Standards for Petroleum Products and Lubricants"). The analysis of the gas products from the test unit which consist of carbon dioxide, hydrogen sulfide and air should be carried out according to the Orsat method. A gas density determination should be made by the Edwards balance method. A carbon analysis determination of the spent catalyst is made by burning the sample in a stream of oxygen, absorbing the $CO_2$ produced and determining the weight of $CO_2$ absorbed. It may be necessary to extract oil from the catalyst prior to the carbon analysis. This is accomplished by washing with 100–150 cubic centimeters alcohol followed by 100–150 cubic centimeters of 95 percent carbon tetrachloride. This is followed by drying in an oven at 375° F. to 400° F. overnight. After drying, the carbon content of the extracted catalyst is then determined. The amount of oil extracted is determined by evaporating the extract until no trace of carbon tetrachloride or alcohol is detected. The residue remaining is the oil removed from the catalyst.

A weight balance should be made. One hundred times the total weight of liquid product plus gas product plus carbon divided by the weight of oil feed is the weight balance in percent. For a test unit operation to be acceptable, the weight balance should be between 95 and 100 percent.

The Kellogg activity rating of the catalyst is expressed as volume percent conversion obtained under the standard test conditions. The activity rating can be calculated from the test results as follows:

$$\frac{\text{Total liquid product (grams)}}{\text{Liquid product specific gravity}} = \text{milliliters liquid product}$$

$$\frac{\text{Liquid product (milliliters)} \times \text{volume percent distillate plus loss at 400° F.}}{100} = \text{milliliters gasoline}$$

$$\frac{\text{Total oil feed (grams)}}{\text{Feed specific gravity}} = \text{milliliters oil feed}$$

$$\frac{\text{Milliliters gasoline}}{\text{Milliliters oil feed}} \times 100 = \text{gasoline yield volume percent}$$

Milliliters liquid product − milliliters gasoline
= milliliters cycle oil $$\frac{\text{Milliliters cycle oil}}{\text{Milliliters oil feed}} \times 100 = \text{cycle oil volume percent}$$

100 − volume percent cycle oil
= conversion volume percent
= Kellogg cracking activity in percent In accordance with our invention the material employed as a support in our improved lubricating oil catalysts should possess catalytic cracking activity and should preferably possess an activity for cracking corresponding to a rating of at least 12 percent as defined by the Kellogg scale, more preferably should possess an activity for cracking corresponding to a rating of between 35 and 80 on the Kellogg scale and most preferably should possess an activity for cracking corresponding to a rating of between 60 and 80 on the Kellogg scale. Although catalysts having an activity for cracking equivalent to a rating of 12 percent to 80 percent as defined by the Kellogg scale include the common commercial catalysts used to accomplish random splitting of carbon to carbon bonds such as is necessary for the production of gasoline, when such materials are employed as supports in the lubricating oil hydrogenation catalysts of this invention their activity is highly selective toward ring-scission rather than the random type of cracking activity they exhibit when otherwise used. Although our invention is not limited by any particular theory, it is believed that the reason the supporting material employed should possess at least some catalytic cracking activity is so that it can contribute to the ring-scission activity of the catalyst. On the other hand, although catalysts having an activity for cracking above 80 percent on the Kellogg scale can be employed, it is preferable that the cracking activity of the support does not range appreciably above 80 percent on the Kellogg scale since a support possessing excessive cracking activity may effect substantial concomitant cracking of aliphatic portions of the molecule and thereby greatly reduce the portion of yield which can be employed as a lubricant. According to this theory, the most desirable lubricating oil hydrotreating catalysts are those catalysts which possess an activity for cracking sufficient to accomplish ring-scission but insufficient for concomitant excessive cracking of aliphatic portions of the molecule.

We have discovered that when a halogen is added to the catalysts of this invention and the supporting material possesses even a very small degree of catalytic cracking activity the catalyst produces a lubricating oil having a greatly reduced iodine number as compared to a lubricating oil produced by a non-halogenated catalyst. In addition, when the halogen is added to a catalyst of this invention having a supporting material whose cracking activity corresponds to a rating of at least 60 on the Kellogg scale the resulting catalyst produces a lubricating oil having even lower iodine numbers than the lubricating oils produced by halogenated catalysts whose supporting materials possess lower cracking activity.

We have also discovered that when a halogen is added to a catalyst of this invention it is necessary that the supporting material employed possess an activity for cracking corresponding to a rating of at least 35 on the Kellogg scale and preferably have an activity for cracking corresponding to a rating of at least 60 on the Kellogg scale in order that an improvement in viscosity index of a lubricating oil be achieved as compared to the viscosity index of a lubricating oil produced by a similar non-halogen containing catalyst. We have discovered therefore that in order for the addition of halogen to improve the activity of catalysts of this invention for the production of higher viscosity index lubricating oils it is necessary that the cracking activity of the supporting material employed be equivalent to at least a rating of 35 on the Kellogg scale generally and preferably be equivalent to a rating of at least 60 on the Kellogg scale and that the addition of halogen to catalysts of this invention having as a carrier a material having a lower cracking activity does not effect any improvement in the activity of the catalyst for the production of higher viscosity index lubricating oils. It is therefore seen that in order to achieve a beneficial effect with respect to viscosity index improvement by addition of halogen it is necessary to employ a supporting material having a relatively high cracking activity as described.

The cracking activity of the preferred supporting materials of this invention can also be related to the volume percent of gasoline yield obtained when carrying out the Kellogg test. As described above, the gasoline yield in volume percent is calculated from the Kellogg test results and this calculation is one step in the calculations necessary to determine the Kellogg cracking activity itself. In respect to improvement in hydrogenation activity the preferable supporting materials of this invention possess catalytic cracking activity such that at least 10 percent by volume of gasoline is produced according to the Kellogg test, generally, and preferably possess catalytic cracking activity such that between 40 and 50 percent by volume of gasoline is produced in accordance with the Kellogg test. In respect to ring-scission activity the preferable supporting materials of this invention possess catalytic cracking activity such that at least about 40 percent by volume of gasoline is produced according to the Kellogg test and preferably possess catalytic cracking activity such that between about 45 and 50 percent by volume of gasoline is produced in accordance with the Kellogg test.

The supporting material to be employed in accordance with this invention is not limited to any particular composition. Either synthetic or natural carriers can be employed. Also, materials other than alumina and silica containing compositions can be employed. For example, a magnesia-silica base can be employed in which magnesia replaces alumina. However, materials selected from the group consisting of alumina, silica and composites of silica and alumina are useful as supports for the catalysts of this invention and of these materials selected from the group consisting of alumina and composites of alumina and silica have been found to be especially useful. The composites of silica and alumina are especially advantageous support compositions and, of these, compositions containing between 1 and 99 percent silica are desirable, compositions containing between 5 and 90 percent silica are more desirable and compositions containing between 65 and 90 percent silica are most desirable, the remainder in each case comprising alumina. Whatever composition is employed as a supporting material in the catalyst of this invention must possess catalytic cracking activity and preferably possess an activity for cracking as described.

It is important that whatever is the composition of the carrier material, no substance should be present which is capable of undesirably deactivating its cracking activity or, on the other hand, capable of causing its cracking activity to become excessively random. For example, the presence of certain metals in a cracking catalyst has a disruptive effect upon good cracking characteristics. Calcium is an example of such a metal and it was found that a catalyst employing as a support calcium-alumino silicate in which the carrier material comprised 90 percent alumino silicate was ineffective for the hydrotreatment of lubricating oils.

It is noted that the cracking activity of a sample of material of a given composition can vary widely from the cracking activity of another sample of material of the same composition. The cracking activity of each sample can vary due to the prior treatment of the sample, such as heat to which it is subjected, etc. For example, it was found that H–44 alumina manufactured by the Aluminum Company of America and containing 99.5 percent by weight of alumina when calcined at 1000° F. for 10 hours exhibited a Kellogg activity of 14.1 whereas Harshaw activated alumina which also contains over 99.5 percent by weight of alumina and which was also calcined at 1000° F. for 10 hours exhibited a Kellogg cracking activity of only 5.3. Also, the H–44 alumina catalyst when steamed at 1350° F. at 15 pounds pressure for 8 hours exhibited a Kellogg cracking activity of 10.5 while another sample of H–44 alumina calcined at 1700° F. exhibited a Kellogg cracking activity of 9.6.

The nickel and tungsten are present in some form of combination or mixture with sulfur. The amount of sulfur on the catalyst can vary within wide limits. For example, the amount of sulfur present in the catalyst can range from as low as 0.5 to 2.0 percent or lower to as high as 23 percent or higher, based on the total catalyst weight, with a 2 to 23 percent range being advantageous. The weight percent of sulfur on the catalyst depends on the active metals which are employed, their amount and the manner in which sulfiding is performed.

Although good results are achieved by employing a catalyst having a sulfur content generally within these broad limits, we have found that when the sulfiding operation occurs following impregnation of the support with the total active metal content and calcination the yield of lubricating oil product can be increased by maintaining the sulfur content of the catalyst within a more narrow range. For example, greatly increased yields of lubricating oil are produced when employing a catalyst which has been sulfided following impregnation and calcination of the total active metal content wherein the sulfidation proceeds to an extent such that the finished catalyst contains a quantity of sulfur equivalent to the amount required to convert between about 35 and 100 percent of the active metals present to their sulfides. Most preferably, the amount of sulfur on the catalyst should be equivalent to the amount required to convert about 50 to 63 percent of the active metals to their sulfides.

When the entire sulfiding operation occurs after all the active metals have been impregnated upon the support and calcined, the only sulfur that can adhere to the catalyst with any substantial degree of permanence when it is onstream is the sulfur which chemically combines with the active metals to form the sulfides of these metals. Generally, the supporting material is substantially non-reactive in the presence of the sulfiding agent. Unless especially severe sulfiding conditions are employed the maximum amount of sulfur that can ordinarily be retained by a catalyst which has been sulfided following impregnation of the support with the total active metal content and calcination is that quantity of sulfur required to completely convert the active metals present to the sulfide form. For example, if the active metals are nickel and tungsten, the maximum quantity of sulfur that can be deposited under ordinary sulfiding conditions is that quantity required to theoretically convert tungsten to tungsten disulfide and nickel to nickel sulfide. Especially severe sulfiding conditions would have to be employed to deposit a quantity of sulfur greater than the amount required to convert all the tungsten to tungsten disulfide and all the nickel to nickel sulfide. When discussing a catalyst wherein the total sulfiding is accomplished following complete impregnation of the support with the active metals and calcination, which is the preferred method of sulfiding, it is therefore convenient to express the sulfur content of the catalyst in terms of the percent of active metals in the catalyst which are converted to their sulfides.

If it is desired to deposit considerably more sulfur upon the catalyst than can be deposited by sulfiding following impregnation and calcination of the total active metal content, the sulfiding operation can be carried out in stages wherein alternating impregnation and sulfidation steps are performed. For example, if the catalyst is sulfided in stages, one sulfiding stage occurring after the supporting material has been impregnated with one active metal and dried but not calcined, followed by another sulfiding stage occurring after impregnation of the support with another active metal and drying without calcining, the quantity of sulfur contained on the catalyst can range considerably above the amount contained in a catalyst having active metals within the ranges of this invention wherein between 35 and 100 percent of these metals are converted to the sulfide. In one example, when sulfiding in stages and without calcination in this manner a catalyst was produced containing 131 percent of the sulfur theoretically required to convert the active metals to the sulfide. However, the catalyst produced by the stagewise sulfiding operation possesses a serious disadvantage in that it is physically unstable onstream during the hydrotreating process as compared to a catalyst prepared by sulfiding after the support has been impregnated with the total active metal content.

When sulfiding occurs between impregnation steps the finished catalyst can contain considerably more sulfur than a catalyst prepared by total impregnation of active metals followed by calcination and sulfiding since some uncombined sulfur can become entrapped between metal layers. This entrapment of uncombined sulfur may account for the physical instability of a catalyst prepared in this manner.

When the catalyst of this invention is sulfided in accordance with the preferred method, that is, after impregnation of the support with the total active metal content and calcination and when the catalyst contains the most preferred amount of sulfur, that is, between 50 and 63 percent of the sulfur required to convert the active metals to the sulfides, although no increase of viscosity index as compared to other sulfided catalysts is achieved, a substantial increase in yield of lubricating oil at a given viscosity index is produced as compared to a similar catalyst prepared in like manner but having a sulfur content above or below this range. It appears therefore that a cooperative effect between the cracking-type support and the sulfur in the preferred catalyst may exist. Although we do not wish to be bound by any particular theory, the sulfur present may tend to render the cracking activity of the support more selective towards ring-scission rather than random cracking and tend to diminish the amount of random cracking caused by the cracking type supporting material of this invention. This is evidenced by the fact that employing a catalyst having the preferred sulfur range does not result in a catalyst capable of producing a higher viscosity index oil, thereby indicating that the preferred sulfur range in itself does not exhibit catalytic activity, but rather results in a catalyst capable of producing an increased yield of lubricating oil of a viscosity index level which is attainable with a similar catalyst wherein the sulfur content is outside the preferred range. Therefore, it appears the preferred range of sulfur serves to constructively channel the catalytic activity of the supporting material.

The halogen containing sulfided catalyst comprising nickel and tungsten supported upon a carrier material having cracking activity is contacted with a stream of deasphalted liquid hydrocarbon charge oil which is heavier than the desired lubricating oil product in admixture with a stream of hydrogen under hydrotreating conditions of temperature, pressure and hydrogen-charge oil ratio. By hydrotreating conditions we mean those conditions of temperature, pressure and hydrogen-charge oil ratio which are favorable for the furtherance of hydrogenation activity and ring-scission activity. The charge stock should first be deasphalted in order to produce a higher quality lubricating oil and also to hold coke formation to a minimum, thereby reducing fouling of the catalyst. The passage of liquid hydrocarbon charge and hydrogen can be maintained in continuous onstream operation substantially longer with supported catalysts than with unsupported catalysts, since the supported catalysts of this invention age much more slowly than the unsupported form.

Any method may be employed for the preparation of the catalyst compositions of this invention. For example, the carrier material can be impregnated with a solution containing a salt of nickel and a salt of tungsten column group VI metal and a salt of a group VIII metal. The proportions of the salts placed in solution are adjusted to produce a catalyst containing the desired total amount of metals and the desired ratio of metals to each other. The impregnated carrier is then dried at a temperature sufficiently high to reduce the impregnated metals to the form of the oxide. The catalyst is then sulfided by treatment with a sulfur containing gas such as hydrogen sulfide.

Halogen promotion may be effected by halogen treating the carrier before the addition of the metals. The finished catalyst can also be halogen treated. In addition, the halogen treatment can be effected simultaneously with the impregnation of the active metals upon the carrier, thereby omitting a drying step from the catalyst preparation process. The preferable halogen to be employed is fluorine which can be in the form of hydrogen fluoride. The addition of other fluorine compounds to either the support or the finished catalyst, for example, aqueous solutions of metal fluorides, can also effectuate a promotion.

Table 1 shows the results of tests conducted to illustrate the effect of halogen addition upon a number of sulfided supported nickel-tungsten catalysts, the only significant difference between each catalyst being the cracking activity of the supporting material which is employed. These tests illustrate the effect upon iodine number and viscosity index of a lubricating oil product treated with halogen containing catalysts of this invention having as supports materials of differing cracking activities. For each test made, the results are compared with those obtained by the use of a similar but non-halogen containing catalyst. In the preparation of the catalysts employed in the tests shown in Table 1, the supporting materials were received in powdered form and were pelleted, calcined at 1000° F. for 10 hours and sized to 10–20 mesh. In the tests where the catalysts were fluorine promoted, the fluorine was added to the supporting material as hydrogen fluoride prior to impregnation with tungsten and nickel. They were then vacuum impregnated with a duometal aqueous solution of ammonium metatungstate and nickel nitrate to deposit the desired metal content and atomic ratio of metals. The catalysts were then dried at 250° F. for 24 hours and calcined at 1000° F. for 10 hours. The catalysts were then sulfided at 600° F. in a stream containing 10 percent by volume of hydrogen sulfide and 90 percent by volume of hydrogen which was passed over the catalyst at 1890 standard temperature and pressure volumes per volume of catalyst per hour for 8 hours and at atmospheric pressure. Each catalyst was tested by hydrotreating a blend containing two-thirds Ordovician unpressable distillate and one-third deasphalted residuum at a temperature of 740° F., a pressure of 3000 pounds per square inch gauge, 5000 standard cubic feet of hydrogen per barrel of charge and a space velocity of 0.5 liquid volumes of hydrocarbon charge per volume of catalyst per hour. The charge stock had a gravity of 25.3° A.P.I., an iodine number of 13.0 and a viscosity index of 95. The lubricating oil results shown in Table 1 are based on analyses of non-dewaxed lubricating oil products topped at 725° F.

TABLE 1

| Catalyst support | Triple A manufactured by American Cyanamid Company | | MSA manufactured by American Cyanamid Company | | H-42 manufactured by the Aluminum Company of America | | H-44 manufactured by the Aluminum Company of America | |
| --- | --- | --- | --- | --- | --- | --- | --- | --- |
| Catalytic cracking activity of support: | | | | | | | | |
| Expressed as Kellogg cracking activity in percent | 73.9 | | 68.1 | | 29.7 | | 14.1 | |
| Expressed as gasoline yield in volume percent as determined by the Kellogg test | 46.6 | | 47.5 | | 22.7 | | 11.5 | |
| Support composition | 75 weight percent silica, 25 weight percent alumina. | | 85 weight percent silica, 15 weight percent alumina. | | 5 weight percent silica, 95 weight percent alumina. | | Over 99.5 weight percent alumina. | |
| Catalyst sulfided | Yes | Yes | Yes | Yes | Yes | Yes | Yes | Yes |
| Metal content, percent by weight: | | | | | | | | |
| Tungsten | 14.24 | 15.18 | 15.23 | 17.06 | 22.95 | 19.56 | 18.69 | 19.28 |
| Nickel | 5.27 | 5.72 | 5.87 | 6.39 | 7.20 | 6.53 | 5.52 | 6.19 |
| Halogen content, percent by weight: | | | | | | | | |
| Fluorine | 0 | 1.09 | 0 | 1.22 | 0 | 1.79 | 0 | 1.51 |
| Product: | | | | | | | | |
| Viscosity index | 129 | 137 | 127 | 130 | 124 | 122 | 122 | 123 |
| Iodine number | 7.8 | 1.2 | 5.8 | 1.2 | 8.8 | 2.5 | 5.8 | 3.2 |

As shown in Table 1, each halogenated catalyst employed produced a lubricating oil having a greatly reduced iodine number as compared to a lubricating oil produced by a non-halogenated catalyst. However, the catalysts employing the Triple A and MSA supporting materials, both manufactured by the American Cyanamid Company, having Kellogg cracking activities of 73.9 and 68.1, respectively, produced lubricating oils having lower iodine numbers than the lubricating oils produced by the catalysts employing the H-42 and H-44 supporting materials, both manufactured by the Aluminum Company of America, having Kellogg cracking activities of 29.7 and 14.1, respectively. Based on the data shown in Table 1, in respect to reduction of iodine number the supporting material of a halogen containing catalyst of this invention should possess cracking activity, and preferably should possess a cracking activity corresponding to a rating of at least 12 on the Kellogg scale and most preferably should possess a cracking activity corresponding to a rating of between 60 and 80 on the Kellogg scale.

The data in Table 1 also show the occurrence of a substantial improvement in viscosity index of a lubricating oil treated with a halogen containing catalyst having the Triple A or MSA supporting materials as compared to the use of similar non-halogen containing catalysts. However, the addition of halogen to catalysts employing H-42 or H-44 supports, both having appreciably lower cracking activities, had no substantial effect upon the viscosity index of a treated lubricating oil. It is therefore seen that in order to achieve a beneficial effect with respect to viscosity index improvement when employing a halogen containing catalyst of this invention, it is essential to employ a supporting material having a relatively high cracking activity. In order to achieve viscosity index improvement with a halogen containing catalyst the supporting material employed in the catalyst should possess a cracking activity corresponding to a rating of at least 35 on the Kellogg scale, generally more preferably between 35 and 80 on the Kellogg scale and most preferably between 60 and 80 on the Kellogg scale.

Further tests were conducted to compare the activity of a fluorine promoted catalyst and a nonfluorine promoted catalyst in respect to viscosity index and iodine number of a lubricating oil hydro-treated with each at varying temperatures. In preparing the halogenated catalysts for these tests, 100 grams of Triple A supporting material were treated with 300 grams of a 2.5 percent aqueous solution of hydrogen fluoride for 15 minutes at 70-90° F. and atmospheric pressure and then calcined. This support was found to contain 1.25 weight percent fluorine. This support was impregnated with 25 weight percent nickel and tungsten in a ratio of 1:1, dried, calcined and sulfided at 600° F. for 8 hours with a 90-10 hydrogen-hydrogen sulfide volume mixture at one atmosphere. The resulting catalyst was used for the hydrotreatment of a blend containing two-thirds Ordovician unpressable distillate and one-third Ordovician deasphalted residuum. The gravity of the charge stock was 25.1° API and the viscosity was 665 SUV:Secs. at 100° F. and 72.8 SUV:Secs. at 210° F. The viscosity index of the charge was 99 and the iodine number was 14.1. The hydrotreatments were carried out at temperatures of 715° F., 730° F., and 745° F. and at a space velocity of 0.5 liquid volumes of hydrocarbon charge per hour per volume of catalyst, a pressure of 3000 pounds per square inch gauge, and 5000 standard cubic feet of hydrogen per barrel. A similar catalyst, which was not treated with fluorine, was prepared and also utilized for the hydrotreatment of the Ordovician blend at similar conditions. The results of these tests are shown in Table 2.

TABLE 2

| Reactor temperature during test, °F. | Properties of the treated lubricant | Catalyst | |
| --- | --- | --- | --- |
| | | Non-fluorine promoted | Fluorine promoted |
| 715 | Viscosity index | 116 | 121 |
| | Iodine number | 8.9 | 1.5 |
| 730 | Viscosity index | 126 | 129 |
| | Iodine number | 7.9 | 1.5 |
| 745 | Viscosity index | 128 | 136 |
| | Iodine number | | 1.5 |

It is seem from Table 2 that at all three temperatures the use of a fluorine promoted catalyst yielded a lubricating oil product having a higher viscosity index and a lower iodine number than that obtained by the use of a non-fluorine promoted catalyst.

Table 3 shows the results of tests conducted to illustrate the effect of sulfiding on the catalysts of this invention. For purposes of comparison a group of similar silica-alumina impregnated with nickel and tungsten catalysts were prepared in which the support, comprising 75 weight percent silica and 25 weight percent alumina and manufactured by the Davison Chemical Company, was impregnated with the total active metal content and calcined before being subjected to further treatment. One of these catalysts was employed for testing without further treatment and in this catalyst the active metals were presumably in the form of the oxide. The other catalysts were sulfided under differing sulfiding conditions to produce catalysts having sulfur contents equivalent to various percent conversions of the active metals to their sulfides. In all the tests the nickel and tungsten employed in the catalyst comprised about 21 percent of the total catalyst weight in a nickel to tungsten atomic ratio of 1 to 0.6 and was promoted with 1.7 weight percent of fluorine.

These catalysts were then used to hydrotreat a blend containing two-thirds Ordovician unpressable distillate and one-third Ordovician deasphalted residuum. The properties of this blend were as follows:

Gravity, ° API _____ 23.8
Viscosity:
    SUS at 100° F _____ 718
    SUS at 210° F _____ 73.0
Viscosity index _____ 91
ASTM color (Union) _____ 1 8
Carbon residue (Conradson percent) _____ 0.66
Iodine number _____ 13.2
Percent sulfur _____ 0.30

[1] Dilute

This blend was hydrotreated with the above noted various catalysts at temperatures between 650° and 745° F., a pressure of 3000 pounds per square inch gauge and a space velocity of 0.5 liquid volumes of hydrocarbon charge per volume of catalyst per hour. The results of the hydrotreatments with the various catalysts are shown in Table 3. The lubricating oil products of the tests were topped at 725° F. and were not dewaxed prior to testing. It is noted that a temperature range, 650° to 745° F., is given for the hydrotreating tests since each catalyst was tested at four temperatures within this range, 650° F., 715° F., 730° F., and 745° F., and from the data taken at each temperature a yield-viscosity index curve was obtained for each catalyst and from this curve the yield of 125 and 130 viscosity index oil reported in Table 3 for each catalyst was obtained. It is also noted that the weight percentage of sulfur in each of the sulfided catalysts in Table 3 can be obtained by multiplying the percent of active metals theoretically converted to their sulfides by 8.73 percent, since a catalyst of the composition employed contains 8.73 percent by weight of sulfur when theoretically 100 percent of the active metals are sulfided.

Table 3 shows that, in respect to a yield-viscosity index basis, the catalysts which were sulfided to a sulfur content equivalent to the conversion of at least 35 percent of the active metals present to their sulfides are superior to the catalyst that was untreated following impregnation of the carrier and calcination. Of the sulfided catalysts, the ones containing an amount of sulfur equivalent to that required to convert between about 50 and 63 percent of the metals present to their sulfides produce the highest yield of both 125 and 130 viscosity index oil.

As shown in Table 3 all the sulfided catalysts tested were highly active for the reduction of iodine number of the oil treated since each sulfided catalyst tested produced a lubricating oil having an iodine number of only 1.5.

The hydrogenation reaction conditions used in the tests specified in this application are not a limitation upon the reaction conditions under which the catalysts of this invention can be employed. For example, the catalysts of this invention can be employed for the hydrogenation of a deasphalted lubricating oil charge stock within a pressure range of 1500 to 10,000 pounds per square inch gauge. The process pressure should be at least 1500 pounds per square inch gauge to maintain the hydrogenation activity and ring scission activity which is necessary for the production of a low iodine number and high viscosity index lubricating oil. The process temperature can range from 650° F. to 825° F. Space velocities of 0.25 to 3.0 liquid volumes of hydrocarbon charge per hour per volume of catalyst can be employed. The hydrogen circulation rate can range from 2000 to 15,000 standard cubic feet of hydrogen per barrel. The charge stock which is employed should first be deasphalted and have a Conradson carbon number below approximately 4.5 so that carbon formation during the hydrogenation process will be kept to a minimum, thereby holding to a minimum catalyst aging due to coke formation. The effectiveness of the sulfided supported catalyst of this invention is not limited to any particular charge stock but can be employed to produce an upgraded lubricating oil using as a charge any deasphalted hydrocarbon oil which is heavier than the desired lubricating oil product,

TABLE 3

| Catalyst | | | Lubricating oil product | | | |
|---|---|---|---|---|---|---|
| Active metals not sulfided after calcination | Sulfided catalyst: sulfur content expressed as percent of active metals theoretically converted to sulfide | Sulfiding conditions | Yield of 125 viscosity index oil: percent by volume of charge | Yield of 130 viscosity index oil: percent by volume of charge | Hydro-treating temperature required to produce a 125 viscosity index lubricating oil | Iodine number |
| Yes | 0 | | 61 | | 738 | 5.0 |
| | 23 | 10 percent by volume of hydrogen sulfide in hydrogen, 500° F. | 65 | | | |
| | 39 | 10 percent by volume of hydrogen sulfide in hydrogen, 600° F. | 72 | | | |
| | 47 | 50-50 percent by volume of hydrogen and hydrogen sulfide 600° F., 2 atmospheres, 2 hours, 330 standard cubic feet per hour. | 70 | 61 | 734 | 1.5 |
| | 53 | 5 percent by volume of hydrogen sulfide in hydrogen, 600° F., 2 atmospheres, 6 hours, 320 standard cubic feet per hour. | 75 | 67 | 731 | 1.5 |
| | 59 | 10 percent by volume of hydrogen sulfide in hydrogen, 600° F., 2 atmospheres, 6 hours, 330 standard cubic feet per hour. | 75 | 67 | 730 | 1.5 |
| | 67 | 10 percent by volume of hydrogen sulfide in hydrogen, 600° F., 1 atmosphere, 8 hours. | 72 | 65 | 735 | 1.5 |
| | 70 | 50-50 percent by volume of hydrogen sulfide and hydrogen, 600° F., 2 atmospheres, 6 hours, 330 standard cubic feet per hour. | 70 | 60 | 735 | 1.5 |
| | 72 | 50-50 percent by volume of hydrogen sulfide in hydrogen, 600° F.- 2 atmospheres, 6 hours, 500 standard cubic feet per hour. | 73 | | 734 | 1.5 |
| | 79 | 50-50 volume percent of hydrogen sulfide and hydrogen, 600° F., 5 atmospheres, 6 hours, 130 standard cubic feet per hour. | 69 | 61 | 734 | 1.5 |
| | 104 | 50-50 percent by volume of hydrogen sulfide and hydrogen, 900° F., 2 atmospheres, 6 hours, 425 standard cubic feet per hour. | 69 | 56 | 739 | 1.5 | such as another lubricating oil, a residuum, or a crude oil.

Various changes and modifications may be made without departing from the spirit of this invention and the scope thereof as defined in the following claims.

We claim:

1. A catalyst composition for the preparation of lubricating oils by treating liquid deasphalted hydrocarbons admixed with hydrogen under hydrotreating conditions comprising fluorine containing sulfided nickel and tungsten upon a supporting material having an activity for cracking corresponding to a rating of between 60 and 80 on the Kellogg scale, the weight of fluorine being between 0.3 percent and 2.5 percent of the total catalyst weight, the total weight of said nickel and tungsten being 5 percent to 40 percent of the total catalyst weight, the weight of sulfur being 2 percent to 23 percent of the total catalyst weight and the ratio of tungsten to nickel being between 1 to 0.1 and 1 to 5.

2. A catalyst composition comprising essentially halogen containing sulfided nickel and tungsten disposed upon a supporting material having an activity for cracking corresponding to a rating of at least 12 on the Kellogg activity scale, the total weight of said nickel and tungsten being 5 percent to 40 percent of the total catalyst weight, the amount of halogen being at least 0.3 percent of the total catalyst weight, the total weight of sulfur being 0.5 percent to 23 percent of the total catalyst weight, and the atomic ratio of said tungsten to nickel being between 1 to 0.1 and 1 to 5.

3. A catalyst composition comprising essentially fluorine containing sulfided nickel and tungsten disposed upon a silica alumina supporting material having an activity for cracking corresponding to a rating of 35 percent to 80 percent on the Kellogg scale, the total weight of said nickel and tungsten being 5 percent to 40 percent of the total catalyst weight, the amount of fluorine comprising at least 0.3 percent of the total catalyst weight, the amount of sulfur on said catalyst being equivalent to that amount required to convert between about 50 and 63 percent of the metals to their sulfides, and the atomic ratio of said tungsten to nickel being between 1 to 0.1 and 1 to 5.

4. A catalyst composition comprising essentially fluorine containing sulfided nickel and tungsten upon a supporting material having an activity for cracking corresponding to a rating of between 60 and 80 on the Kellogg scale, the weight of fluorine being between 0.3 percent and 2.5 percent of the total catalyst weight, the total weight of said nickel and tungsten being 5 percent to 40 percent of the total catalyst weight, the weight of sulfur being 2 percent to 23 percent of the total catalyst weight and the ratio of tungsten to nickel being between 1 to 0.1 and 1 to 5.

5. A method for preparing a catalyst comprising impregnating a silica alumina carrier having an activity for cracking corresponding to a rating of between about 35 and 80 percent on the Kellogg scale with a solution containing salts of nickel and tungsten, the proportions of carrier material, nickel and tungsten being adjusted so as to produce a catalyst containing 5 percent to 40 percent of nickel plus tungsten and having an atomic ratio of tungsten to nickel between 1 to 0.1 and 1 to 5, drying, halogenating and sulfiding the impregnated carrier.

References Cited in the file of this patent
UNITED STATES PATENTS

| | | |
|---|---|---|
| 2,744,052 | Nozaki | May 1, 1956 |
| 2,760,907 | Attane | Aug. 28, 1956 |
| 2,885,346 | Kearby et al. | May 5, 1959 |
| 2,904,500 | Beuther et al. | Sept. 15, 1959 |
| 2,904,505 | Cole | Sept. 15, 1959 |
| 2,905,636 | Watkins et al. | Sept. 22, 1959 |
| 2,917,448 | Beuther et al. | Dec. 15, 1959 |
| 2,960,458 | Beuther et al. | Nov. 15, 1960 |
| 2,967,147 | Cole | Jan. 3, 1961 |

UNITED STATES PATENT OFFICE
CERTIFICATE OF CORRECTION

Patent No. 3,078,238                      February 19, 1963

Harold Beuther et al.

It is hereby certified that error appears in the above numbered patent requiring correction and that the said Letters Patent should read as corrected below.

Column 3, line 33, for "composition" read -- compositions --; column 10, line 12, after "tungsten" insert a period; line 13, strike out "column group VI metal and a salt of a group VIII metal."; column 16, line 33, for "Attane" read -- Attane et al. --.

Signed and sealed this 22nd day of October 1963.

(SEAL)
Attest:

ERNEST W. SWIDER
Attesting Officer

EDWIN L. REYNOLDS
Acting Commissioner of Patents